United States Patent
Burckhardt et al.

[11] 3,764,837
[45] Oct. 9, 1973

[54] FREQUENCY TRANSMITTER, ESPECIALLY FOR BRAKE SLIPPAGE CONTROL INSTALLATION OF MOTOR VEHICLES

[75] Inventors: Manfred H. Burckhardt, Waiblingen; Walter Lutze, Esslingen; Paul Schwerdt, Esslingen-Hegensberg, all of Germany

[73] Assignee: Daimler-Benz Aktiengesellschaft, Stuttgart-Untertuerkheim, Germany

[22] Filed: July 9, 1971

[21] Appl. No.: 161,184

[30] Foreign Application Priority Data
July 10, 1970 Germany.................... P 20 34 280.7

[52] U.S. Cl.................................. 310/168, 310/79
[51] Int. Cl. ............................................ H02k 19/20
[58] Field of Search....................... 310/79, 168, 169, 310/170, 171, 76, 77, 93; 322/58

[56] References Cited
UNITED STATES PATENTS

| | | | |
|---|---|---|---|
| 3,551,712 | 12/1970 | Jones | 310/168 |
| 3,500,091 | 3/1970 | Jones | 310/168 |
| 3,604,966 | 9/1971 | Liggett | 310/168 |
| 3,489,935 | 1/1970 | Hayes | 310/168 |
| 3,487,247 | 12/1969 | Scheffler | 310/168 |
| 3,482,129 | 7/1968 | Riordan | 310/168 |

*Primary Examiner*—R. Skudy
*Attorney*—Craig, Antonelli & Hill

[57] ABSTRACT

A frequency transmitter of high accuracy for the indication of the rotating condition of wheels, especially for brake slippage control installations in motor vehicles, in which a rotating part driven by the wheel cooperates by means of teeth with the poles of a stationary magnetic part which may also be provided with teeth, whereby the rotating part is connected with its drive by an axially elastic cross spring that permits a radial play.

29 Claims, 17 Drawing Figures

PATENTED OCT 9 1973 3,764,837
SHEET 1 OF 3
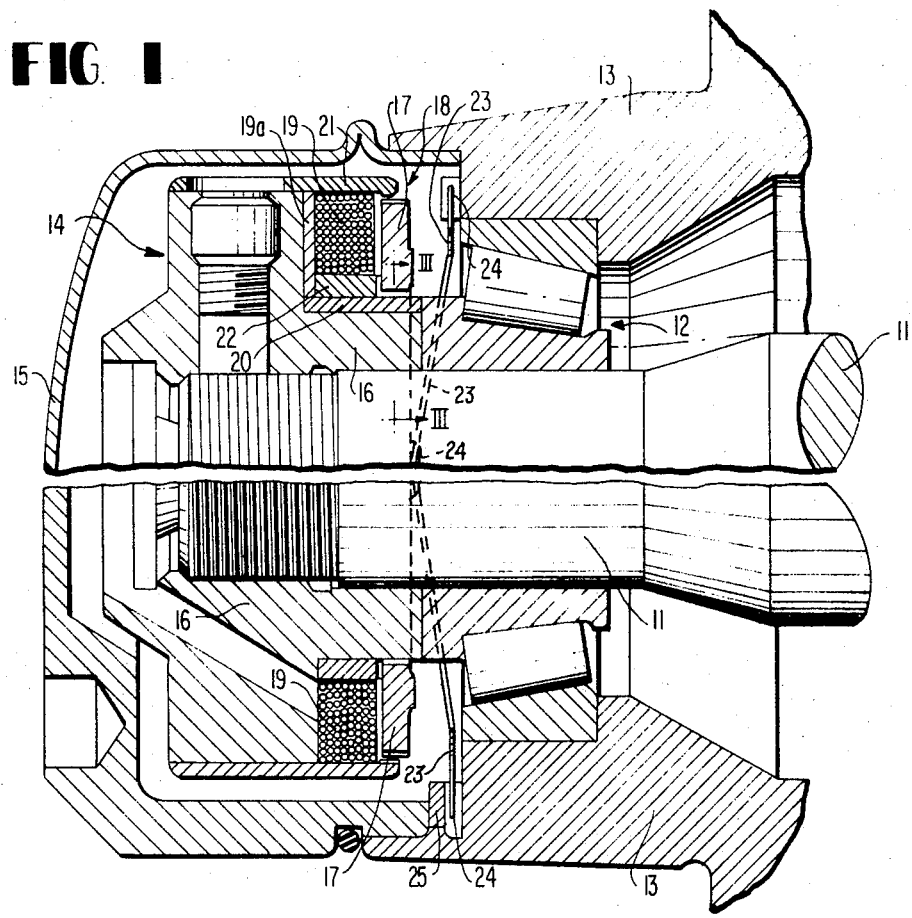
FIG. 1
FIG. 1a
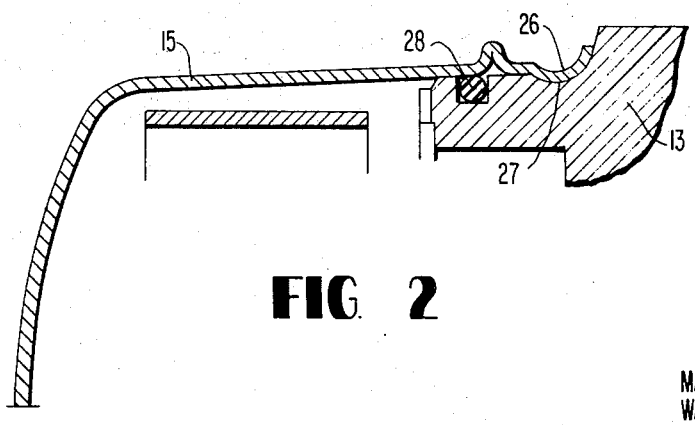
FIG. 2
INVENTORS
MANFRED H. BURCKHARDT
WALTER LÜTZE
PAUL SCHWERDT
BY Craig, Antonelli & Hill
ATTORNEYS

INVENTORS
MANFRED H. BURCKHARDT
WALTER LÜTZE
PAUL SCHWERDT

BY Craig, Antonelli & Hill
ATTORNEYS

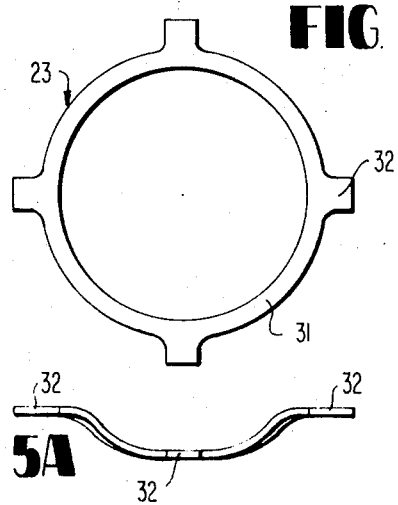
FIG. 5
FIG. 5A
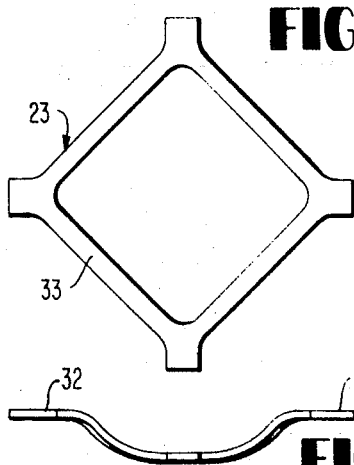
FIG. 6
FIG. 6A
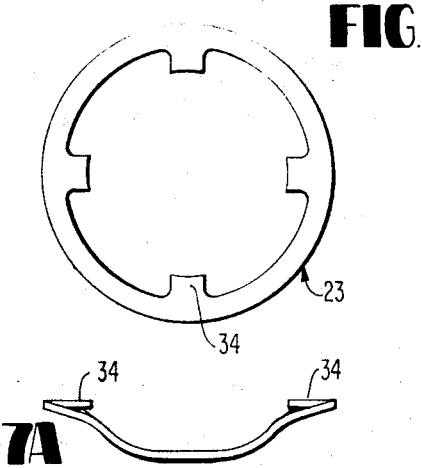
FIG. 7
FIG. 7A
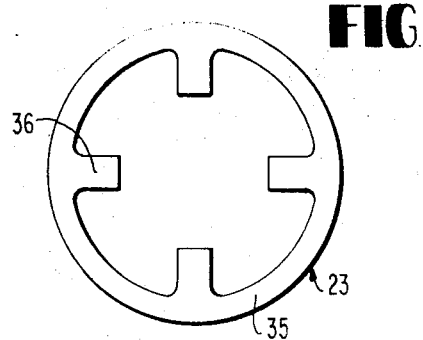
FIG. 8
FIG. 8A
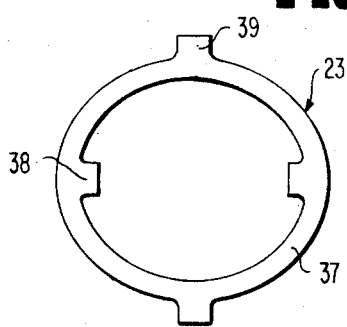
FIG. 9
FIG. 9A
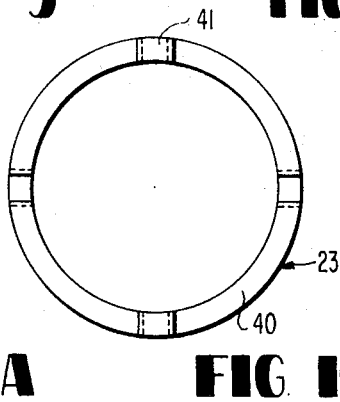
FIG. 10
FIG. 10A
INVENTORS
MANFRED H. BURCKHARDT
WALTER LÜTZE
PAUL SCHWERDT
BY Craig, Antonelli & Hill
ATTORNEYS

FREQUENCY TRANSMITTER, ESPECIALLY FOR BRAKE SLIPPAGE CONTROL INSTALLATION OF MOTOR VEHICLES

The present invention relates to a frequency transmitter of high accuracy for the indication of the rotary condition and behavior of wheels, especially for brake slippage control installations in motor vehicles, whereby a rotary part driven by the wheel cooperates by means of teeth with the poles of a stationary magnetic part, which may also be constructed with teeth.

With control systems that influence the driving behavior, as for example, in brake slippage control systems, an exact indication of the wheel behavior is necessary. Since the indicating accuracy has to be independent of external influences such as, for example, the temperature, the principle of the aforementioned frequency transmitter — also referred to as pulse sensor or feeling device — has proved as the most favorable.

A sufficient "resolving power" is thereby attainable only with a large number of pulses per rotation whereby this number of pulses depending on the requirements as regards control quality has to be approximately between 300 and 600 pulses per rotation. The large number of pulses is necessary in order to be able to detect rapidly and accurately the timely pulse change, i.e., the rotational acceleration of the wheel. The large number of the teeth leads to small tooth dimensions and therewith to very small air gaps. In order to avoid any impairment by atmospheric influences, the entire frequency transmitter additionally has to be altogether so small that its diameter is only slightly larger than that of a wheel bearing in order that it can be accommodated protected within the area of the wheel bearing.

Due to these small dimensions, the gaps become so small that they can be realized technically only by a closed type of construction with its own bearing. Hence, an integration into the axle is thereby no longer possible.

However, from this results the problem for the drive of the rotating part of the frequency transmitter. A simple entrainment would produce non-permissive errors already with very slight alignment errors of the axes, which errors especially for an evaluation of the acceleration are not acceptable. Hence, a drive for the rotating part has to be found which permits also in case of an offset of the axes a practically play-free entrainment accurate as regards angular movements.

The underlying problems are solved according to the present invention with the aforementioned frequency transmitters in that the rotating part is connected with its drive by an axially elastic cross spring which permits a radial play. The teeth are thereby generally arranged radially at the rotating part even though, of course, an axial arrangement of the teeth is also feasible. A radial tooth system may be disposed at the rotating part either outwardly or inwardly thereof whereby the arrangement outwardly thereof is preferred. Furthermore, the present invention prefers an embodiment according to which the rotating part is supported at the inner circumference thereof on a bush of soft magnetic material and a further bush of non-magnetic material is secured on this first-mentioned bush, against which the rotating part is in constant abutment with its end face under the influence of the cross spring.

The construction according to the present invention offers the advantage that an angularly accurate drive of the rotating part is assured in every case, also when a slight axial offset between the wheel bearing and the bearing of the rotating part in the frequency transmitter should be present. Additionally, the rotating part is also constantly secured in the axial direction by the cross spring in accordance with the present invention.

In one embodiment according to the present invention, transversely disposed grooves for the accommodation of lubricant and/or dirt particles are provided in the radial and/or axial bearing supports of the rotating part. These grooves may be disposed in the rotating part or in the stationary part. Additionally, a lubrication is also achieved thereby so that the unavoidable abrasion can deposit itself immediately in the grooves and consequently a seizing of the bearing is avoided.

It is additionally proposed by the present invention that the cross spring — as viewed in the axial direction — is constructed annuarly shaped or similarly and that — starting from an imaginary center plane perpendicular to the axis — it is axially arched or bent out of the center plane alternately toward the two sides in several cross planes, for example, in two cross planes mutually displaced by the same angle and is provided at these places with connecting elements to the rotating part and to the drive. The annularly shaped part forms therefore the spring body properly speaking, whereas the connecting elements represent the entrainment means. However, it is also feasible not to construct the spring body annularly shaped but instead to form the same in the manner of a quadrangle, square, oval, or in a similar manner.

A further feature of the present invention resides in that projections are arranged at the cross spring as connecting elements which engage into corresponding grooves at the rotating part and at the drive. It is proposed in that connection that the projections extend radially inwardly or outwardly from the spring body of the cross spring. They may thereby all extend in the same direction; however, pair-wise mutually oppositely disposed projections may also extend alternately inwardly or outwardly.

In order that the radial dimensions also of the drive can be maintained as much as possible for the reasons discussed above, the present invention proposes that the projections arranged as such in the radial direction are bent back into the contour of the spring body, as viewed axially. Another proposal of the invention also serves the same purpose, according to which the projections are pressed out of the spring body itself in the axial direction, and more particularly in the direction of the arching of the spring body.

According to a further development of the inventive concept, the cross spring is arranged between the axle bearing and the rotary part facing the stator. In this manner, the seating of the cross spring can be examined and tested prior to the emplacement of the outer projective cap for the entire frequency transmitter. Of course, the cross spring may also be arranged in principle outwardly, i.e., between the frequency transmitter and the externally assemblable rotating cover.

As an additional measure for the reduction of the dimensions of the frequency transmitter, the present invention further proposes that a coil devoid of a winding body and consisting of a wire with thermoplastic lacquer is arranged in the stationary part which is adapted to be hardened or cured by a defined current pulse.

Accordingly, it is an object of the present invention to provide a frequency transmitter, especially for brake slippage control installations in motor vehicles which avoids by simple means the aforementioned shortcomings and drawbacks encountered in the prior art.

Another object of the present invention resides in a frequency transmitter, especially for brake slippage control installations in motor vehicles, which not only exhibits high accuracy but also a relatively compact construction, uninfluenced by external atmospheric conditions.

A further object of the present invention resides in a frequency transmitter of the type described above which insures an angularly accurate entrainment of the rotating part thereof notwithstanding slight errors in the axial alignment of the parts.

A still further object of the present invention resides in a frequency transmitter, especially for brake slippage control installations in motor vehicles, which utilizes an axially elastic cross spring to permit a radial play.

These and further objects, features, and advantages of the present invention will become more obvious from the following description when taken in connection with the accompanying drawing which shows, for purposes of illustration only, several embodiments in accordance with the present invention, and wherein:

FIG. 1 is an axial cross-sectional view through one-half of a first embodiment of a frequency transmitter in accordance with the present invention, the other half being of symmetrical construction;

FIG. 1a is an axial cross-sectional view through one-half of a modified embodiment of a frequency transmitter in accordance with the present invention, with the other half of symmetrical construction;

FIG. 2 is a partial cross-sectional view through a modified embodiment of a cover arrangement in accordance with the present invention;

Figure 4:
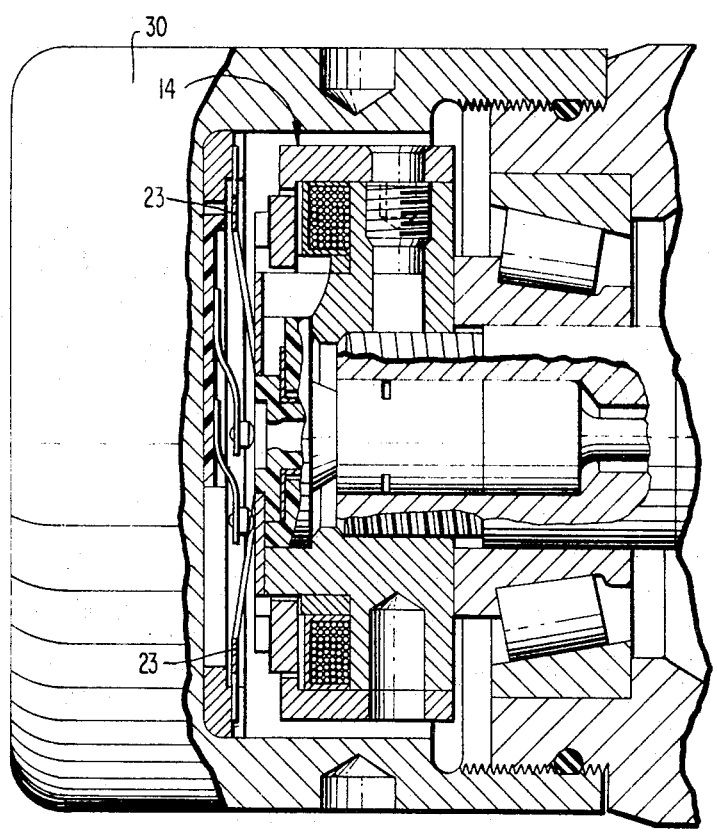

FIG. 4 is a partial cross-sectional view of a modified embodiment of a frequency transmitter with a different arrangement of the cross spring according to the present invention; and FIGS. 5 and 5a, FIGS. 6 and 6a, FIGS. 7 and 7a, FIGS. 8 and 8a, FIGS. 9 and 9a and FIGS. 10 and 10a are, respectively, plan and side views of various modified embodiments of a cross spring in accordance with the present invention.

Referring now to the drawing wherein like reference numerals are used throughout the various views to designate like parts, and more particularly to FIG. 1, a wheel body 13 of any conventional construction and therefore not illustrated in detail is supported on the fixed axle 11 by means of a wheel bearing generally designated by reference numeral 12. A frequency transmitter generally designated by reference numeral 14 is arranged outside of the wheel bearing 12, which frequency transmitter is closed with respect to the outside by a rotable cover 15 that in turn is secured in the wheel body 13, for example, by threaded means.

The frequency transmitter 14 is constituted by a stator 16 non-rotatably secured on the axle 11 and by a rotating part 17 which cooperate with each other in a conventional manner by radial, mutually oppositely disposed tooth systems generally designated by reference numeral 18. A coil 19 preferable a winding-body-free coil 19 consisting of a wire with a thermoplastic laquer which is adapted to be hardened or used by a defined current pulse, is additionally arranged in the stator 16. The magnetic flux extends from a radial polarized permanent magnetic disk 19a by way of the inner bush 20 and the outer bush 21 of magnetizable material to the rotating part 17.

The rotating part 17 is supported on the inner bush 20. A further bush 22 of non-magnetic material is mounted on this inner bush 20 against which the disk-like rotating part 17 abuts with its end face. This abutment is maintained by a cross spring 23 which is provided for the entrainment and which will be described more fully hereinafter.

The cross spring 23 engages with projections 24 in correspondingly shaped grooves at the wheel body 13 and at the rotating part 17. The cross spring 23 is slightly compressed in the axial direction during the assembly so that it retains the rotating part 17 in constant abutment at the non-magnetic sleeve 22. It also permits a slight axial offset between the wheel bearing support and the bearing support of the rotating part 17 on the stator 16.

In the embodiment of FIG. 1a the construction is in principle the same as in FIG. 1. However, in the embodiment of FIG. 1a, the coil 19 itself serves for the creation of the magnetic field. Consequently, in this embodiment the rotating part 17 is directly supported on a shoulder of the stator 16. The projections 24 of the cross spring 23 are received in grooves at a separate ring part 25 which rotates in unison with the wheel body 13. The other differences which can be recognized from the drawing between the two embodiments of FIGS. 1 and 1a are non-essential and without significance for the present invention.

According to FIG. 2, the cover 15 is inserted with an edge bead 26 into a corresponding groove 27 at the wheel body 13. Hence, it does not need to be threadably secured. A seal 28 seals the frequency transmitter (not shown in FIG. 2) against external atmospheric influences.

Figure 3:
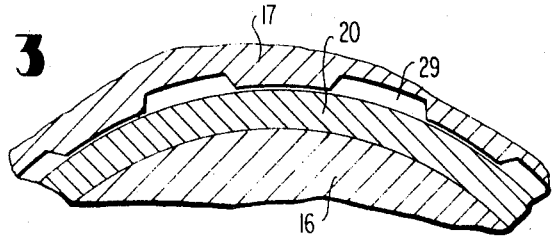
FIG. 3 is a partial cross-sectional view, taken along line III—III of FIG. 1.

According to FIG. 3, the rotating part 17 is provided at its inner circumference, i.e., therefore at its bearing surface, with cross grooves 29. These cross grooves 29 serve for the accommodation of a lubricant and above all also for the accomodation of abraded and dirt particles so that the bearing support is not impaired. This same groove arrangement, as to the rest, may also be provided at the axial bearing support of the rotating part 17, i.e., in the instant case the non-magnetic sleeve 22 is also provided at its end face with corresponding grooves.

According to FIG. 4, the frequency transmitter is constructed in the same manner. However, the arrangement takes place in a reverse manner so that the cross spring 23 is now disposed between the frequency transmitter generally designated by reference numeral 14 and the cover 30. However, its construction and function correspond completely to the arrangement according to FIGS. 1–3.

According to FIGS. 5 and 5a, the cross spring 23 has a closed-loop or ring-shaped spring body 31 which is provided with four extensions 32 that are directed radially outwardly and are mutually offset by 90° each. The spring body 31 is arched in the axial direction and more particularly in such a manner that two mutually opposite projections 32 each are disposed, respectively, in two different axial planes spaced from each other. The cross springs 23 engages by means of these projections 32 arranged, respectively, pair-wise in the same plane, on the one hand, into the rotating part and, on the other, into the wheel body.

According to FIGS. 6 and 6a, the cross spring 23 is constructed in principle in the same manner and the projections are arranged in a similar manner as in connection with the cross spring according to FIGS. 5 and 5a. However, the spring body 33 is no longer ring-shaped but is constructed in the manner of a quadrangle or square.

According to FIGS. 7 and 7a, the cross spring 23 has again a ring-shaped construction or, corresponding to FIG. 6, a quadrangular construction, and its projections 34 are all directed inwardly. In all other points, this spring also corresponds to the embodiments described so far.

According to FIGS. 8 and 8a, the spring body 35 of the cross spring 23 is made at first with inwardly directed projections 36, for example, is stamped out with such projections. However, these projections 36 are then bent through 180° so that, as viewed axially, they are disposed within the contour of the spring body 35 (FIG. 8a). In this manner, the entrainment — as viewed axially — can take place along the same diameter as possesses the spring body 35, i.e., a type of construction results which is compact in the radial direction.

According to FIGS. 9 and 9a, the spring body 37 of the cross spring 23 is constructed oval and is provided with oppositely disposed inwardly directed projections 38 and outwardly with directed projections 39. In order to achieve also in this case a construction which is as compact as possible in the radial direction, the last-mentioned projections 39 are arranged at the place of the smallest diameter of the oval whereas the first-mentioned projections 38 are disposed at the place of the largest diameter of the oval.

According to FIGS. 10 and 10a, the spring body 40 of the cross spring 23 is again constructed ring-shaped, and is provided itself with projections 41. These projections 41 are pressed out of the spring body 40 in the same direction as the arched portions thereof.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim

1. A frequency transmitter for the indication of the rotating behavior of wheels, especially for brake slippage control installations in motor vehicles, in which a rotating part driven by a wheel cooperates by tooth means with poles of stationary magnetic part, characterized in that the rotating part is operatively connected with its drive means by an axially elastic cross spring means enabling a radial play, the cross spring means including arched portions bent out into different planes at several places, and in that connecting means including projections radially extending from a spring body of the cross spring means are provided at said places for engagement in corresponding grooves at the rotating part and at the drive means.

2. A frequency transmitter according to claim 1, characterized in that the drive means is a wheel body.

3. A frequency transmitter according to claim 1, characterized in that the stationary magnetic part is also provided with tooth means.

4. A frequency transmitter according to claim 1, characterized in that the rotating part is supported at the inner circumference thereof on a bush means of soft magnetic material, and in that a further bush means of non-magnetic material is secured on the first-mentioned bush means, the rotating part being in constant abutment with an end face thereof against the second bush means.

5. A frequency transmitter according to claim 4, characterized by bearing support means for the rotating part provided with cross grooves for the accommodation of at least one of lubricant and dirt.

6. A frequency transmitter according to claim 5, characterized in that the bearing support means provided with the cross grooves is a radial bearing support.

7. A frequency transmitter according to claim 6, characterized in that the bearing support means of the rotating part provided with cross grooves is an axial bearing support.

8. A frequency transmitter according to claim 1, characterized by bearing support means for the rotating part provided with cross grooves for the accommodation of at least one of lubricant and dirt.

9. A frequency transmitter according to claim 8, characterized in that the bearing support means provided with the cross grooves is a radial bearing support.

10. A frequency transmitter according to claim 9, characterized in that the bearing support means of the rotating part provided with cross grooves is an axial bearing support.

11. A frequency transmitter according to claim 8, characterized in that the bearing support means of the rotating part provided with cross grooves is an axial bearing support.

12. A frequency transmitter according to claim 1, characterized in that the projections extend radially inwardly.

13. A frequency transmitter according to claim 1, characterized in that the projections extend radially outwardly.

14. A frequency transmitter according to claim 1, characterized in that the projections are formed into the contour of the spring body as viewed in the axial direction.

15. A frequency transmitter according to claim 1, characterized in that the projections are formed of the spring body itself in the axial direction.

16. A frequency transmitter according to claim 1, characterized in that the cross spring means is arranged between an axle bearing means and the rotating part facing a stator.

17. A frequency transmitter according to claim 16, characterized in that a coil means devoid of a winding body is arranged on the inside of the stator and consisting of a wire with a thermoplastic lacquer which is adapted to be hardened by a defined current surge.

18. A frequency transmitter for the indication of the rotating behavior of wheels, especially for brake slippage control installations in motor vehicles, in which a rotating part driven by a wheel cooperates by tooth means with poles of stationary magnetic part, characterized in that the rotating part rotates about an axis and is operatively connected with its drive means by an axially elastic cross spring means enabling a radial play, said cross spring means being constructed as a closed loop and having connecting means with the rotating part and with the drive means at spaced places along the extent of the loop, at least one of said places being normally positioned in a first plane and at least one of the other places being positioned in a second plane substantially parallel to and spaced from said first plane, said first and second planes being cross planes displaced with respect to each other by the same angle, the loop portion of said cross spring means extending between said connecting means in said first and second planes being arched and resilient in a direction substantially perpendicular to said first and second planes.

19. A frequency transmitter according to claim 18, characterized in that said connecting means include projections at the cross spring means which engage in corresponding grooves at the rotating part and at the drive means.

20. A frequency transmitter according to claim 19, characterized in that the projections extend radially from a spring body of the cross spring means.

21. A frequency transmitter according to claim 20, characterized in that the projections extend radially inwardly.

22. A frequency transmitter according to claim 20, characterized in that the projections extend radially outwardly.

23. A frequency transmitter according to claim 20, characterized in that the projections are formed into the contour of the spring body as viewed in the axial direction.

24. A frequency transmitter according to claim 20, characterized in that the projections are formed of the spring body itself in the axial direction and in the direction of a respective bent out portion of the spring body.

25. A frequency transmitter according to claim 20, characterized in that the cross spring means is arranged between an axle bearing means and the rotating part facing a stator.

26. A frequency transmitter according to claim 25, characterized in that a coil means devoid of a winding body is arranged on the inside of the stator and consisting of a wire with a thermoplastic lacquer which is adapted to be hardened by a defined current surge.

27. A frequency transmitter according to claim 20, characterized in that the stationary magnetic part is also provided with tooth means.

28. A frequency transmitter for the indication of the rotating behavior of wheels, especially for brake slippage control installations in motor vehicles, in which a rotating part driven by a wheel cooperates by tooth means with poles of stationary magnetic part, characterized in that the rotating part rotates about an axis and is operatively connected with its drive means by an axially elastic cross spring means enabling a radial play, said corss spring means being constructed as a closd loop and having connecting means with the rotating part and with the drive means at spaced places along the extent of the loop, at least one of said places being normally positioned in a first plane and at least one of the other places being positioned in a second plane substantially parallel to and spaced from said first plane, said first and second planes being cross planes displaced with respect to each other by the same angle, the loop portion of said cross spring means extending between said connecting means in said first and second planes being arched and resilient in a direction substantially perpendicular to said first and second planes, said connecting means for connection with the rotating part being positioned in said first plane and said connecting means for connection with the drive means being positioned in the second plane, said connecting means being alternately positioned in the first and second planes along the extent of the loop.

29. A frequency transmitter according to claim 28, characterized in that the spring means has arched portions bent out into two cross planes displaced with respect to each other by the same angles.

* * * * *